US012756557B1

(12) United States Patent
Domenighetti et al.

(10) Patent No.: US 12,756,557 B1
(45) Date of Patent: Oct. 6, 2026

(54) DNS+ PROTOCOL AND INFRASTRUCTURE FOR ENHANCED DOMAIN UTILITY

(71) Applicant: FREENAME AG, Wollerau (CH)

(72) Inventors: Paolo Domenighetti, Neggio (CH); Davide Vicini, Wollerau (CH)

(73) Assignee: FREENAME AG, Wollerau (CH)

( * ) Notice: Subject to any disclaimer, the term of this patent is extended or adjusted under 35 U.S.C. 154(b) by 0 days.

(21) Appl. No.: 19/445,764

(22) Filed: Jan. 12, 2026

(51) Int. Cl.
*H04L 9/14* (2006.01)
*H04L 9/06* (2006.01)

(52) U.S. Cl.
CPC .............. *H04L 9/14* (2013.01); *H04L 9/0631* (2013.01)

(58) Field of Classification Search
CPC ................................ H04L 9/14; H04L 9/0631
See application file for complete search history.

(56) References Cited

U.S. PATENT DOCUMENTS 11,489,661 B2 * 11/2022 Ghosh ................. H04L 63/0428
2017/0366501 A1 * 12/2017 Pandya ............... H04L 61/4511
2024/0163269 A1 * 5/2024 Kaliski, Jr. ........... G06F 16/958
2025/0190966 A1 * 6/2025 Gutierrez-Sheris .... G06Q 20/20

FOREIGN PATENT DOCUMENTS

AU 2022283634 A1 * 9/2023 ............... H04L 9/08

* cited by examiner

*Primary Examiner* — Han Yang
(74) *Attorney, Agent, or Firm* — Michael L. Greenberg, Esq.; Greenberg & Lieberman, LLC

(57) ABSTRACT

A secure, field-based data sharing protocol leveraging the DNS infrastructure with DNSSEC, post-quantum cryptography, and real-time usability flows. The protocol enables domain owners to selectively expose structured confidential data (e.g., IBANs, credit cards, wallets, phone numbers) to authorized entities like banks, PSPs, or telcos using a set of predictable, encrypted DNS TXT records. It introduces a format for revocable, auditable, and verifiable publishing of confidential information, distributed without centralized APIs.

25 Claims, 5 Drawing Sheets

FIGURE 3B

ACCESS CONTROL MATRIX

500

| FIELD TYPE | AUTHORIZED ENTITY | ENCRYPTION | REVOCATION | USE CASE REF | CLAIM REF | REF NUM |
|---|---|---|---|---|---|---|
| IBAN | Banks | AES-256-GCM | Real-time | Use Case 1 | Claims 1,19 | 502 |
| Credit Card | PSPs | AES-256-GCM | Real-time | Use Case 2 | Claims 1,2 | 504 |
| Wallet Addr | DeFi Services | AES-256-GCM | Real-time | Use Case 3 | Claims 1,21 | 506 |
| Phone Num | Telecoms | AES-256-GCM | Real-time | Use Case 4 | Claims 1,20 | 508 |
| Healthcare | Med Providers | AES-256-GCM | Real-time | Use Case 5 | Claims 1,19 | 510 |
| Auth Creds | Services | Optional | Real-time | Use Case 10 | Claims 8,16 | 512 |
| ZK Proofs | Verifiers | Commitment | N/A | Use Case 11 | Claims 8,17 | 514 |

NAMESPACE FEATURES SUMMARY

520

- Granular per-field access control (522)
- Predictable structured naming (524)
- Version compatibility (526)
- Real-time lifecycle management (528)
- DNSSEC authenticity (530)
- Differential privacy (532)

DNS+ PROTOCOL AND INFRASTRUCTURE FOR ENHANCED DOMAIN UTILITY

FIELD OF THE PRESENT INVENTION

The present invention relates to the field of internet infrastructure, and more specifically relates to a highly secure Domain Name System (DNS) configured with additional functionality, namely including features pertaining to metadata distribution and security. The present invention provides a decentralized, interoperable, and future-proof framework for secure data sharing, particularly across sectors such as banking (including International Banking Account Numbers (IBAN)), Payment Service Providers (PSPs), telecoms, and Web3.

BACKGROUND OF THE PRESENT INVENTION

In today's digital infrastructure, the exchange of confidential data-such as IBANs, wallet addresses, and personal identifiers-relies heavily on centralized systems. APIs, proprietary databases, and closed platforms dominate data delivery, introducing privacy risks, operational bottlenecks, and single points of failure. As institutions and individuals move toward decentralized models of interaction, these legacy architectures pose serious constraints on scalability, resilience, and sovereignty.

Meanwhile, the Domain Name System (DNS), despite its ubiquity and ongoing evolution with extensions such as DNSSEC, remains an underutilized vehicle for secure data transport. Thus, there is a need for an enhanced DNS system which enables secure data sharing across a variety of sectors, including banking, payment services, telecoms, and web3.

The present invention, referenced as a DNS+ Final Variant protocol, reimagines DNS as a cryptographically sound metadata distribution channel. By combining domain-based identifiers with robust encryption and signature schemes, DNS+ enables data publishers to expose individual confidential fields in a controlled, verifiable, and recipient—specific manner—without depending on APIs or blockchain infrastructure.

Existing protocols for confidential data sharing rely heavily on centralized infrastructure (APIs, privacy risks, and single points of failure). At the same time, DNS—despite its global adoption, fails to provide a secure transport layer for sensitive metadata. The DNS+ protocol transforms the DNS system into a usable and cryptographically secure channel to publish, encrypt, and retrieve confidential data fields. This enables:

a. Decentralized self-publishing
b. Field-level access control
c. Post-quantum forward secrecy
d. Real-time revocation and updates
e. Full backward compatibility with DNS and TLS stacks Few similar concepts are present in the prior art. US Patent application number US20250190966A1, filed by Gutierrez-Sheris on Dec. 9, 2024, is for a system for securely sharing verified identity information between users in a distributed network while preserving the confidentiality of sensitive data. The sharing process is mediated by a trusted verification entity, which transmits encrypted information to authorized recipients over secure communication channels that are distinct from the blockchain layer. These channels may implement encryption protocols such as AES-256 or RSA and rely on centralized or hardware-based key management solutions like HSMs. The approach focuses on secure transmission, authenticated access, and cryptographic integrity, particularly in scenarios involving settlement data and identity verification.

However, the protocol differs significantly from the present invention in both transport architecture and cryptographic access control. The present invention does not rely on out-of-band secure channels or centralized verification services as is taught by Gutierrez-Sheris. Instead, the present invention defines a decentralized protocol for publishing encrypted data directly within DNS TXT records, where each record is individually encrypted using AES-256-GCM and protected through recipient-specific access via Kyber-768 key encapsulation. Unlike the system taught by Gutierrez-Sheris, where key management and transport are separated and often trusted to intermediaries, the present invention embeds all necessary encrypted content, metadata, and access logic within DNS itself, enabling any compliant resolver to retrieve and decrypt data securely—without needing side-channel communication or platform-specific infrastructure.

Further, patent AU 2022283634A1, filed on Dec. 5, 2022, by Baixin Liu teaches the use of AES-GCM encryption with a 256-bit key, and also incorporates Kyber-768 and ECDH-P-384 for key exchange. Similar to the present invention, Liu describes secure data exchange between decentralized systems and regulatory bodies. However, unlike the invention taught by Liu, the present invention embeds all encrypted content, metadata, and encapsulated keys directly within DNS TXT records which are publicly accessible but cryptographically protected. The present invention formalizes a protocol for controlled access to such data via post-quantum KEMs like Kyber-768 and authenticated encryption with AES-256-GCM. Further, unlike the invention taught by Liu, which seemingly focuses on secure API interactions and hybrid cryptography within private or federated systems, the present invention enables decentralized publication and retrieval of sensitive data across an open and standardized DNS-based layer.

Additionally, the invention taught by Liu describes a system in which a DNS monitor observes the resolution status of domain names across various resolvers, including those of local ISPs and public services like Google or Cloudflare. This monitoring data is then used to guide the behavior of internal components, such as the Queue Publisher and Queue Handler, by writing status updates to a centralized memory system. The DNS is treated purely as a signaling layer to assess system availability or detect anomalies. No aspect of the protocol utilizes DNS as a medium for storing or transporting encrypted or structured data, nor is DNS involved in any data-sharing or access-control mechanism.

In contrast, the present invention establishes DNS itself as the active transport layer for sensitive data. It defines explicit roles for publisher entities, resolver parties, and the DNS infrastructure itself within a cryptographic protocol. Encrypted records, key encapsulation, metadata, and access controls are embedded directly into DNS TXT records, enabling decentralized, recipient-specific data sharing across the public DNS system. Unlike the monitoring-focused role of DNS in the patent, the invention treats DNS as a core, standardized component of secure data distribution, with formalized interactions between all involved entities.

Additionally, US Patent Application No. US20170366501A1, filed on Aug. 31, 2017, by Pandaya et al. teaches the use of AES-256 symmetric encryption to protect customer-specific data embedded within DNS records, particularly within TXT fields used as placeholders for aliases. The patent describes a managed directory system where the encrypted alias data can be decrypted by the customer using a pre-provisioned symmetric key, along with a salt or initialization vector. It also allows for limited delegation by enabling the customer to authorize other entities to access the same cryptographic key. This confirms that the prior art does indeed cover the concept of encrypted DNS TXT records for sensitive data, albeit within a centralized and platform-managed environment.

However, Pandaya does not disclose the use of AES-256-GCM for authenticated encryption, nor does it mention recipient-specific access control using Kyber-768 or any post-quantum mechanism. Unlike the managed model in the reference, the invention proposes a decentralized protocol where encrypted data, metadata, and key encapsulation artifacts are all publicly distributed via DNS in a standardized format.

In short, the combination of cryptographic control, decentralized publishing, and DNS-native compatibility distinguishes the present invention from existing post-quantum systems, identity frameworks, or DNSSEC extensions. The present invention enables a new class of applications around secure data distribution, programmable DNS records, and identity-bound encrypted metadata.

SUMMARY OF THE PRESENT INVENTION

The present invention is a post-quantum secure protocol, referenced as DNS+, for the encrypted and revocable distribution of confidential data using the Domain Name System (DNS). The DNS+ protocol is a post-quantum secure method for publishing confidential data via DNS, enhancing privacy and security without centralized dependencies.

The present invention preferably utilizes DNSSEC, Kyber-768, and AES-256-GCM for encryption and data integrity. Additionally, the present invention enables recipient-specific encryption and verifiable publishing of sensitive information. In certain embodiments, the protocol provides a decentralized, interoperable framework for secure data sharing that avoids reliance on centralized application programming interfaces (APIs) and proprietary database systems.

The protocol of the present invention addresses the limitations of centralized data exchange systems, promoting decentralized interactions. It is known that centralized APIs and databases pose privacy risks and operational bottlenecks. DNS is underutilized for secure data transport despite its widespread use. Therefore, the present invention, referenced as DNS+, reimagines DNS as a secure metadata distribution channel for confidential fields.

The cryptographic foundation of DNS+ ensures confidentiality, authenticity, and resilience against quantum attacks. AES-256-GCM provides authenticated encryption for data fields. Kyber-768 enables per-recipient encryption of AES keys, enhancing security. DNSSEC guarantees the integrity and authenticity of all published records.

Regarding DNS record architecture and format, the protocol of the present invention defines a structured namespace for DNS TXT records, facilitating secure data exchange. Records include enc., key., meta., rev., file., zk., and auth.* for various data components. Each record type serves a specific purpose, such as storing encrypted data or metadata. The naming convention includes field names, versions, and domain identifiers for clarity.

Regarding key distribution logic, recipient-specific access control is achieved through public key encryption, ensuring secure data sharing. Publishers must obtain the recipient's Kyber public key for encryption. The process involves generating an AES key, encrypting the data, and wrapping the key for the recipient. Recipients maintain their Kyber key pairs and publish public keys for verification.

The resolution process of the present invention allows secure retrieval and decryption of data using standard DNS infrastructure. Metadata retrieval and validation are the first steps in the resolution flow. Revocation checks ensure that invalidated fields are not used. The process includes DNSSEC verification, key decapsulation, and payload decryption.

The present invention incorporates revocation and expiration to manage the lifecycle of encrypted fields effectively. Revocation is preferably indicated by a rev. record, allowing immediate invalidation of fields. In turn, expiration is managed through an exp parameter in meta. * records, ensuring timely data validity. Both mechanisms interact with DNS TTLs for real-time updates and governance.

The protocol of the present invention supports linking external content and cryptographic proofs through dedicated record types. These record types include, but may not be limited to:

a. file.* records anchor external encrypted files, ensuring verifiability through checksums.

b. zk.* records allow commitments to zero-knowledge proofs, enhancing privacy.

These features enable verifiable off-chain data exchange and integrity guarantees.

Furthermore, DNS+ introduces mechanisms to mitigate statistical and behavioral leakage from query patterns. Differential privacy is implemented via a dp=field in meta. * records to obscure access patterns. Randomized record naming adds entropy to the namespace, reducing enumeration risks. These privacy layers complement the protocol's cryptographic protections.

The DNS+ protocol of the present invention is supported by a layered infrastructure for secure data publication and resolution. Authoritative DNS servers manage DNSSEC-signed records and dynamic updates. A Record Management API layer of the present invention facilitates secure record publishing and validation. Further, DNS+ Resolver SDKs enable integration of resolution capabilities into applications.

The DNS+ Final Variant protocol allows individuals and organizations to bind encrypted or public data fields (like payment info or identity attributes) to domain names they control. By integrating Kyber-768 key encapsulation with AES-GCM symmetric encryption, and by layering these over DNSSEC-signed records, the protocol ensures both forward secrecy and strong authenticity. Use cases include banking (resolving IBANs via domains), payment processing (credit card bindings), Web3 wallet discovery, and phone number directory services.

The following brief and detailed descriptions of the drawings are provided to explain possible embodiments of the present invention but are not provided to limit the scope of the present invention as expressed herein this summary section.

BRIEF DESCRIPTION OF DRAWINGS OF THE PRESENT INVENTION

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

Figure 1:
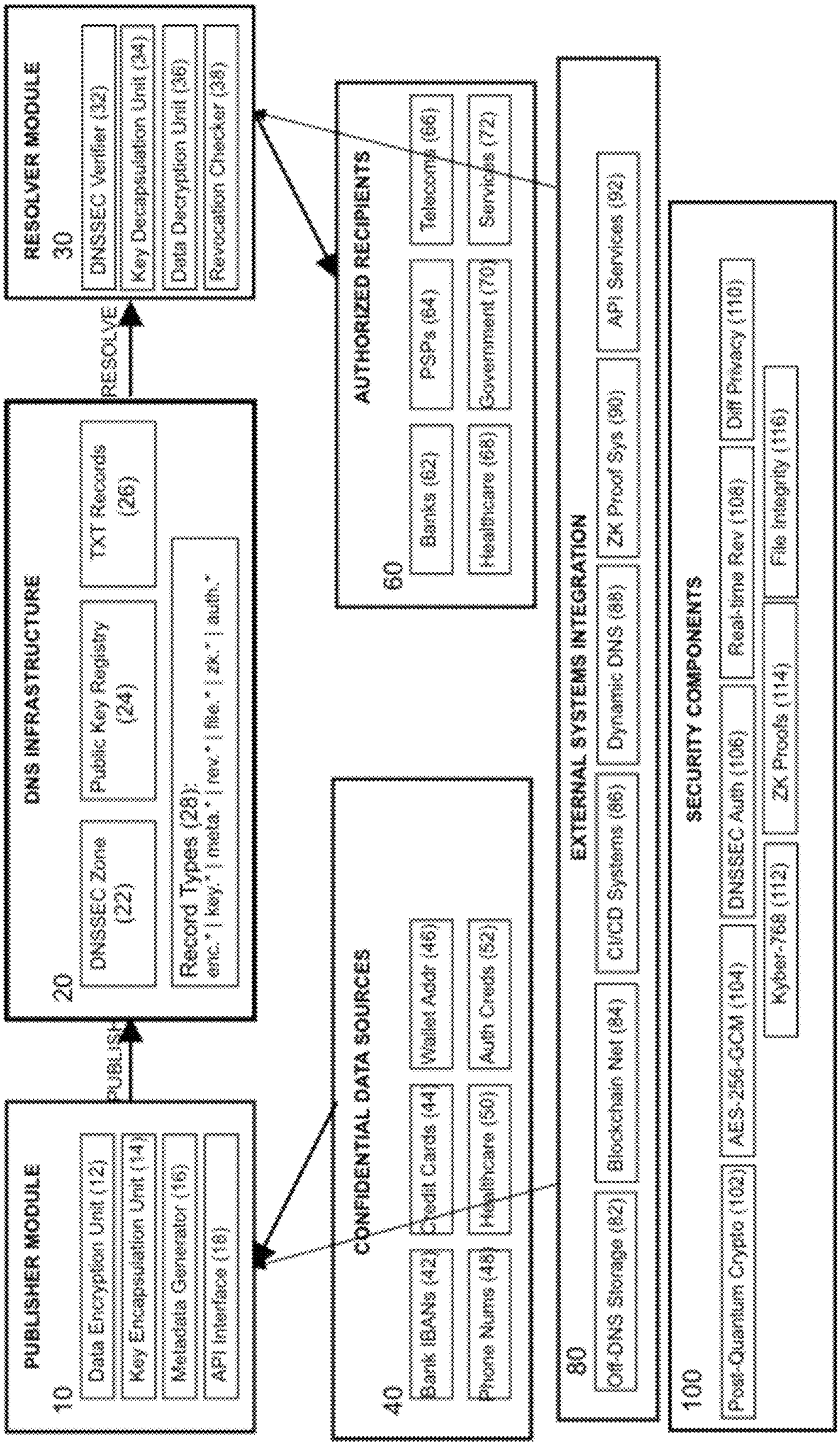
FIG. 1 depicts a flow chart detailing a first use case of the system and protocol of the present invention.
Figure 2:
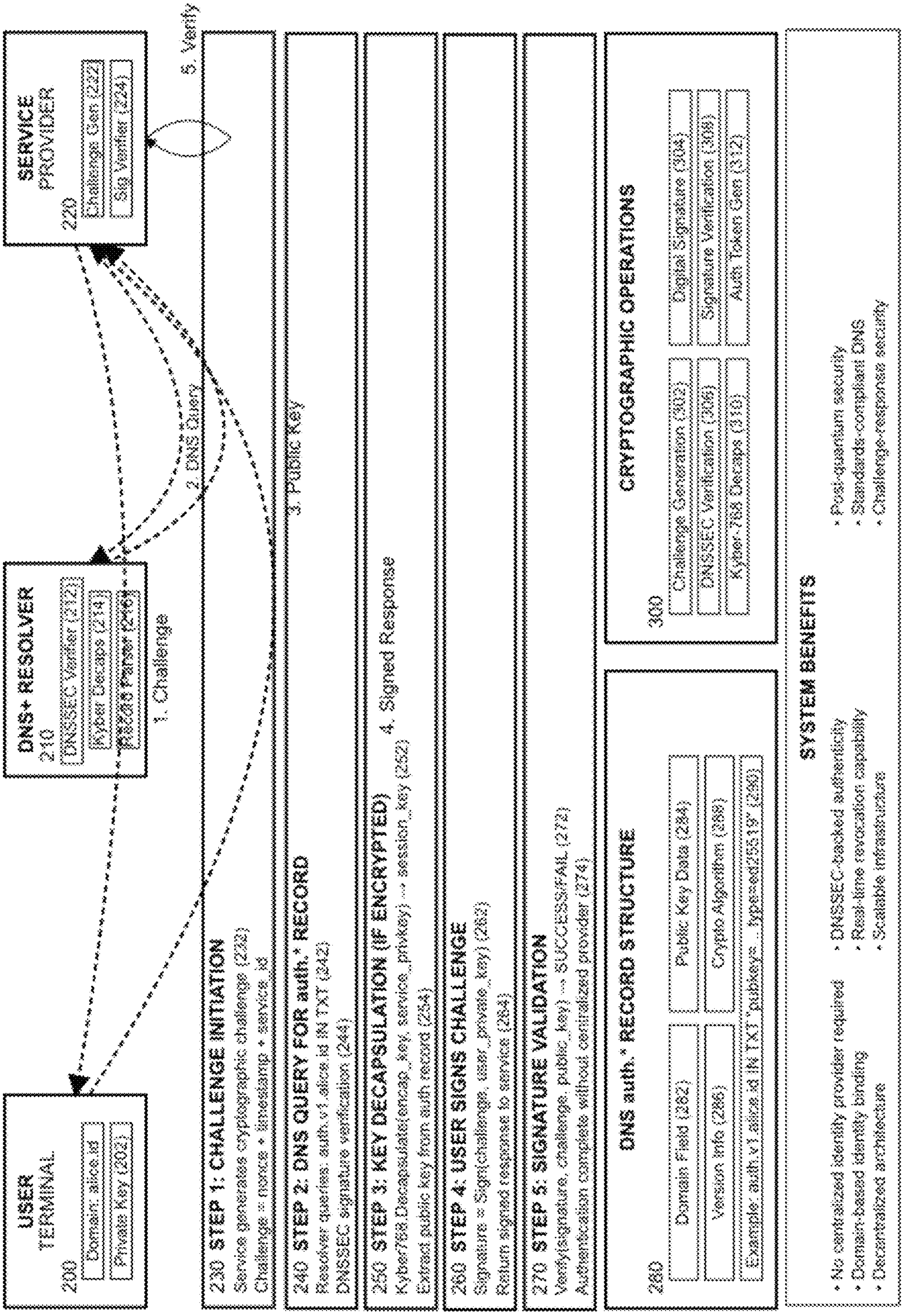
FIG. 2 depicts a flow chart detailing a second use case of the system and protocol of the present invention.
Figure 3A:
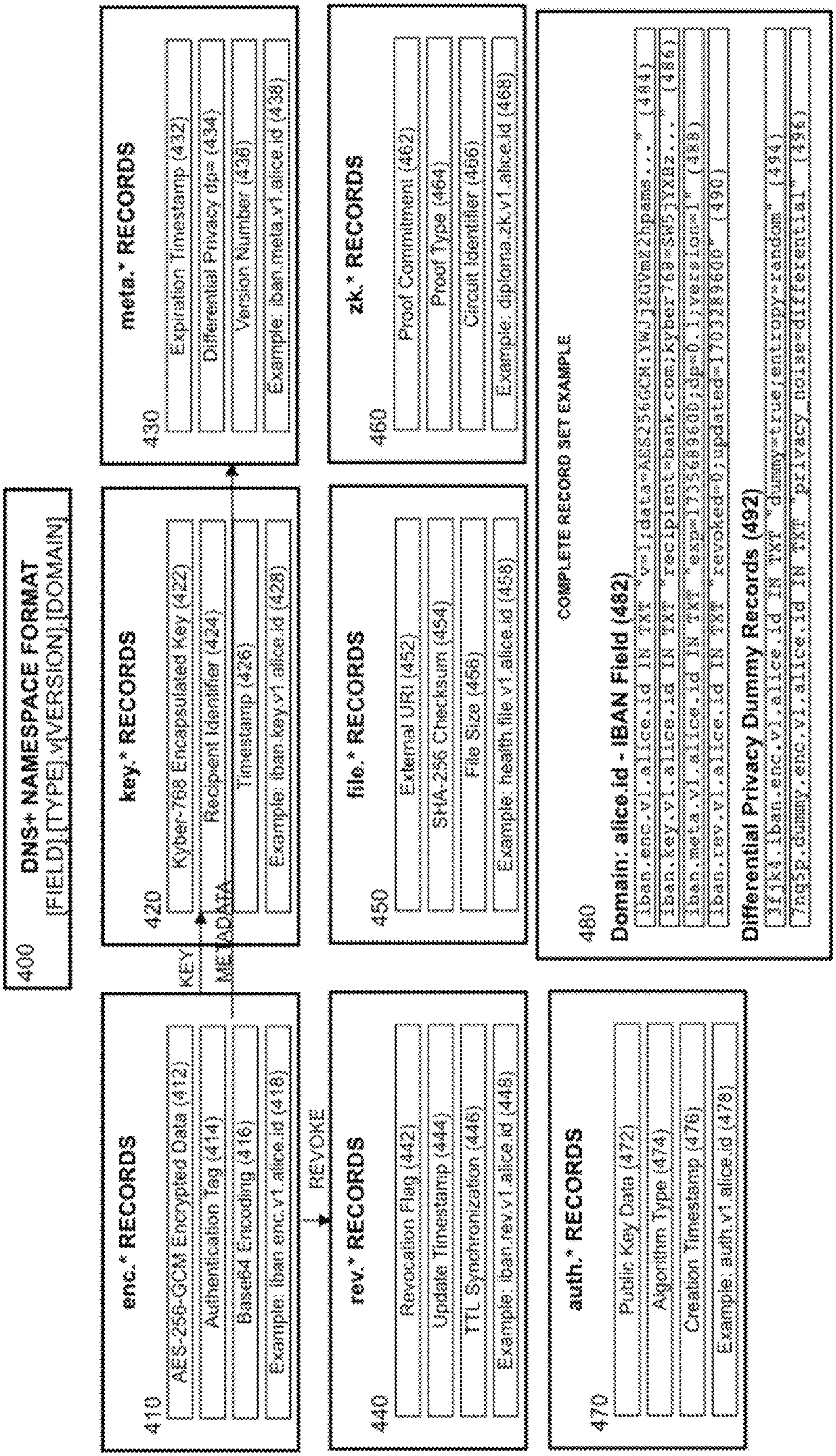

FIG. 3A exhibits a table detailing the product suite of the present invention.

FIG. 3B depicts a continuation of the flow chart of FIG. 3A.

Figure 4:
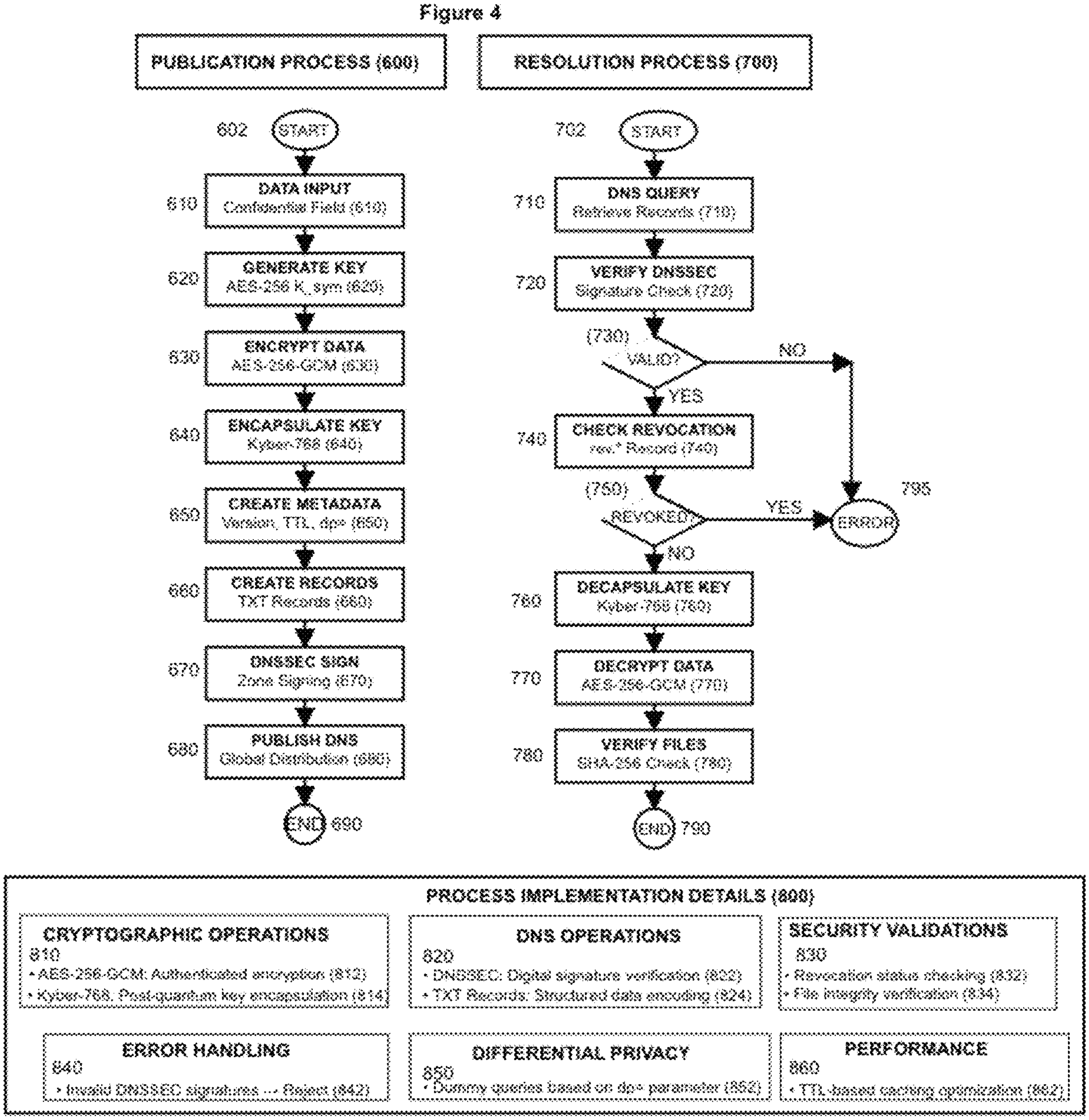

FIG. 4 details the architecture of the DNS+ Publisher SDK and DNS+ Resolver SDK of the present invention.

DETAILED DESCRIPTION OF THE PRESENT INVENTION

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention is a decentralized protocol for the secure attachment and distribution of confidential data fields via the Domain Name System (DNS). Data such as IBANs, credit card numbers, wallet addresses, personal identifiers, and identity credentials can be published by a user or organization under their domain name, in encrypted form, using DNS records. Each data field is encrypted with AES-256-GCM (authenticated encryption). The encryption key is encapsulated using Kyber-768, a post-quantum Key Encapsulation Mechanism (KEM), and is published alongside metadata (type, nversion, expiry, and similar parameters). The records are authenticated using DNSSEC. All records are stored as DNS TXT resource records under structured subdomains (for example, iban.enc.v2.example.com)

The system of the present invention is forward-compatible with emerging DNS record types that support longer payloads or native encryption (e.g., SVCB (Service Binding), HTTPS (Hypertext Transfer Protocol Secure), and/or future text-carrying record classes), thus making the protocol extensible.

The resolver side (e.g., bank, telecom, application) (1) retrieves these records, (2) verifies authenticity via DNSSEC, (3) performs Kyber decapsulation to recover the AES key, and then (4) decrypts the field. The present invention eliminates the need for centralized API gateways or identity providers, functioning as a mechanism for secure data resolution, access control, and revocation, Further, the present invention offers a transparent, DNS-native mechanism for secure data resolution, access control, and revocation.

Each sensitive field is encrypted with AES-256-GCM, and the encryption key is then encapsulated using Kyber-768 with the recipient's public key. All records are transmitted over DNS with full DNSSEC validation.

The present invention is designed for structured fields of limited size due to known DNS TXT constraints—typically under 512-1024 bytes. This supports use cases like account numbers, phone numbers, or tokens. Larger content, such as documents or any kind of file, is supported via external anchoring (or linking) using file.* records, which store a Uniform Resource Identifier (URI) and checksum for off-DNS retrieval. The protocol maintains efficiency by limiting DNS to encrypted access metadata while enabling linked access to larger assets.

Use Case Reference Set for DNS+

The protocol of the present invention supports various practical use cases across multiple sectors, demonstrating its versatility. Examples include secure payment processing, encrypted wallet resolution, and medical record sharing. Each use case outlines the flow from data encryption to recipient-specific resolution, The use cases highlight the protocol's applicability in banking, identity verification, and public administration.

Use Case Examples: How Alice (a First Example User) Publishes Travel Safety Information Alice utilizes travel safety apps and embassy registration forms to share her information securely. She designates embassy or consular access for her data. Her mobile number and contact details are securely wrapped and published on a dynamic DNS zone.

API Key Publishing Process

Bob (a second example user) securely publishes API keys using encrypted DNS records tailored for specific recipients. API credentials are stored in encrypted DNS records, accessible only by a defined platform. Bob publishes the API key encrypted for ServiceX (an example service compatible with the present invention) through an app dashboard or CI/CD system. The process involves encrypting the API key, selecting the recipient platform, and deploying the record using the Freename DNS API.

Decentralized Single Sign-on (SSO) with Domain

In one embodiment, a relying service (ServiceX) enables user to log in without passwords by using a web3 domain. Users such as Alice can log in by entering their domain (for example, alice.id). The process involves querying DNS+ records for the user's public key and verifying those records with DNSSEC. Users maintain control of their identity without relying on central authentication providers.

Example Zone File Structure for bob.com (an Example Domain Tied to a User)

A zone file for bob.com illustrates the structure and types of records used. It includes Start of Authority Record (SOA), NameServer (NS), public wallet records, encrypted wallet records, IBAN, phone number, tax ID, emergency contact, and diploma records. Each record type is categorized, with specific metadata and encryption details provided.

Threat Model and Mitigation Strategies

The DNS+ protocol of the present invention incorporates various threat mitigations to ensure data security. Man-in-the-Middle (MITM) attacks are mitigated through DNSSEC signatures. Key compromise is addressed with recipient-specific keys and key rotation. Data spoofing and record tampering are preferably prevented by enforcing record authenticity and integrity. Replay attacks are preferably mitigated through unique JVs and metadata validation. Unauthorized decryption is prevented by using symmetric keys wrapped for intended recipients.

Developer Tools and SDK Support for DNS+

DNS+ provides a suite of developer tools and SDKs to facilitate integration and management. The tools preferably include a command-line interface (CIA) and a web dashboard for record management. Open-source SDKs are available for Java, Python, and JavaScript/TypeScript, supporting various functionalities. A validation service ensures correct record formats and metadata schema compliance.

Deployment Scenarios for DNS+ Protocol

The DNS+ protocol of the present invention can be deployed across various sectors with flexible configurations. Therefore, banks can resolve encrypted IBANs and credit card bindings with strict logging and audit trails via the features of the present invention. Additionally, telecoms can dynamically update and revoke phone numbers and emergency contacts. Web3 and wallet integrations can coexist with DNS+-based wallet discovery. Governments can verify eID, tax IDs, and diplomas with enforced revocation checks.

Standardization and Open Distribution of DNS+

The present invention is formalized as an open protocol to ensure interoperability and decentralized adoption. An Internet-Draft is published to specify terminology, record formats, and security considerations. An open metadata schema of the protocol of the present invention allows for machine-readable field structures. Furthermore, public key registry and reference SDKs promote a standardized ecosystem for secure data resolution.

The core cryptographic stack of the present invention employs AES-256-GCM encryption, and the encryption key is then further secured via encapsulation using Kyber-768 with the recipient's public key. Features of the cryptographic stack include, but are not limited to:

In some embodiments, AES-256-GCM encryption employs authenticated symmetric encryption with a 96-bit initialization vector and a 128-bit authentication tag. The output structure is preferably {iv, ciphertext, tag}, chosen for performance, auditability, and compatibility.

In some embodiments, the Kyber-768 (ML-KEM) algorithm is used as a post-quantum key-encapsulation mechanism. Kyber-768 is a NIST post-quantum cryptography standard that provides IND-CCA2 security and a KEM interface (ciphertext, shared_key) suitable for wrapping AES keys for each recipient.

DNSSEC is employed for all authoritative zones to validate record authenticity, mitigate spoofing and man-in-the-middle attacks, and support NSEC/NSEC3-based denial-of-existence proofs.

DNS Record Architecture

For each field (e.g., IBAN), a group of DNS records is created:

Prefix Description
enc.* AES-GCM-encrypted value
key.* Kyber-encapsulated AES key per actor
meta.* Metadata (Version, field type, expiry)
rev.* Revocation Status
file.* IPFS or external file reference (optional)
zk.* Zero-knowledge anchors (optional)

Each group is signed via DNSSEC and designed for field-level parsing.

To simplify and standardize publishing, third parties can provide:

i. A CLI tool (dnsplus publish . . . );
ii. A Web dashboard for non-technical users;
iii. RESTful API;
iv. A CI/CD pipeline for dynamic zones;
v. A Linting and validation tool (checks TTL, revocation, expiration); and
vi. A Record generator with form-based field editor.

Deployment Scenarios for Implementation of the System and Protocol of The Present Invention:

The present invention is designed for implementation into a variety of PSPs, Banks, Telecoms, and similar service providers. For example, for banks, implementation of the present invention employs a Java SDK to resolve domains and decrypt IBANs. DNS caching is employed for Batch resolution of payees. Further, an internal gateway logs audit trails to ensure authenticity and transparency.

For Telecoms, phone resolution is disposed in a call routing layer. The SDK parses encrypted numbers and validates metadata. An optional feature is available for emergency contact resolution.

For implementation of the present invention with Web3, Snap integration is preferably employed via MetaMask (Resolve domain→wallet→initiate transaction). The present invention is optionally compatible with ENS/IPNS.

Further, it should be noted that the protocol, system, and method of the present invention exhibits open standard packaging and distribution such that it may be widely adopted easily. The full protocol is to be published as a Request for Comments (RFC) draft and exhibit open SDKs. A standard .dnsplus.json metadata format is optionally employed. A public Freename (or other third-party) registry is available for:

i. Public Kyber keys;
ii. Schema validation; and
iii. SDK reference implementations.

An additional use case for the DNS+ protocol of the present invention is that it enables decentralized, domain-based Single Sign-On (SSO) without requiring centralized identity providers. In this model, a user's domain (e.g., alice.id) becomes a cryptographically verifiable identity anchor that can be used to authenticate with external services.

Unlike traditional SSO systems (e.g., Google, Microsoft), DNS+-based SSO places identity control in the hands of the domain owner, supports revocable credentials, and integrates seamlessly with DNSSEC and post-quantum cryptography for maximum futureproofing.

Additional Embodiments of the Present Invention

AI Agent Identity and Delegated Actions

In certain embodiments, the DNS+ protocol enables verifiable identity and authorization for autonomous or semi-autonomous software agents, such as artificial intelligence (AI) assistants, decision bots, or embedded digital services. These agents require mechanisms for discoverability, cryptographic verification, and scoped authorization without dependency on centralized identity providers or proprietary vendor APIs.

The invention allows each AI agent to publish its identity, attestations, and cryptographic delegations directly under a domain name controlled by its operator. The DNS+ protocol provides both public and encrypted record structures, enabling this self-sovereign identity model. Each domain becomes a cryptographically verifiable trust root, validated by DNSSEC and extended with encrypted DNS+ fields that distribute confidential per-recipient credentials.

Public identity fields, for example agent.meta, agent.cap, agent.policy, agent.jwks, and agent.attest, define the agent's descriptive metadata, declared operational capabilities, governance policies, public key material, and attestation references (such as SBOM manifests or trusted-execution-environment quotes).

Confidential or per-recipient records, such as agent.grant, agent.scope, agent.route, agent.billing, and agent.dp, encapsulate authorization tokens, routing endpoints, billing or settlement details, and privacy budgets. Each encrypted record is produced using an ephemeral symmetric AES-256-GCM key, itself encapsulated via the recipient's Kyber-768 public key to ensure post-quantum confidentiality and exclusivity.

Operational Process:

The agent's operator publishes both public metadata and encrypted authorization records.

A relying party (for example, a financial institution, telecom, or enterprise API provider) discovers the agent via DNSSEC-validated queries.

The relying party verifies attestation proofs and the agent's published JWKS.

Per-recipient encrypted grants are decrypted using the relying party's Kyber private key.

The decrypted authorization scope is enforced during interactions.

Revocation or rotation of delegations is performed by updating the relevant DNS+ TXT records, enabling near-real-time invalidation through standard DNS propagation and TTL expiry.

This embodiment generalizes the DNS+ framework to machine identities, transforming DNS into a distributed identity fabric for autonomous systems. It provides per-recipient confidentiality, cryptographic provenance, decentralized verifiability, and compatibility with existing DNS infrastructure.

AI Agents (Identity and Delegated Actions)

Overview

Modern AI agents—whether autonomous bots, assistants, or embedded service workers—require a way to be discoverable, verifiable, and securely authorized without reliance on centralized registries or vendor-locked APIs. DNS+ provides a universal cryptographic fabric allowing any agent to publish its identity, capabilities, attestations, and delegations directly under its domain using DNSSEC-verified TXT records.

Through DNS+ encryption (Kyber-768+AES-256-GCM), agents can distribute per-recipient encrypted credentials, authorization scopes, and routing information while keeping the structure DNS-native and cacheable.

DNS+ also empowers individual end-users to operate AI agents under personal domain names, enabling autonomous authentication and agent-to-agent discovery, verification, and interaction via DNS-based identity and delegation. By leveraging DNSSEC validation and encrypted DNS+ records, agents may exchange attestations, delegate scoped capabilities, and establish decentralized trust relationships without intermediaries.

Motivation

Without a decentralized trust anchor, AI agents depend on proprietary identity providers or API keys in private databases. The present invention elevates DNS into a machine-readable trust plane wherein each agent domain becomes a self-contained identity and capability registry.

This enables any relying party, such as a bank, telecom, or enterprise API, to verify agent ownership, declared capabilities, and authorization scope through DNS resolution.

Record Architecture

DNS+ Agent Profile:

Uses both public and encrypted TXT fields.

| Field | Description |
|---|---|
| agent.meta | Agent name, version, owner, and model descriptor. |
| agent.cap | Declares supported capabilities (URNs). |
| agent.policy | Machine-readable guardrails (rate limits, privacy guarantees). |
| agent.jwks | Inline or referenced JWK set for verifying agent-signed requests. |
| agent.attest | Attestation references (SBOM, TEE quotes). |
| agent.grant | Per-recipient authorization grant (scoped tokens, expiry, constraints). |
| agent.scope | Fine-grained rights or limits (e.g., per-day transaction caps). |
| agent.route | Private endpoints or mTLS connection hints. |
| agent.billing | Billing or settlement data (IBAN, wallet). |
| agent.dp | Differential-privacy parameters for data-sharing use cases. |

Each encrypted field is generated using Kyber-768 to encapsulate a session key and AES-256-GCM for payload encryption. All records are DNSSEC-signed, ensuring integrity and authenticity.

Operational Flow

Agent's operator publishes public metadata and DNS+ encrypted grants addressed to specific relying parties.

Relying party performs DNS+ resolution of agent domain to retrieve capabilities and policies.

Relying party validates DNSSEC, inspects agent.attest, and retrieves the agent's JWKS for signature verification.

Relying party decrypts agent.grant and agent.scope using its Kyber private key.

Agent interacts via APIs using its registered JWKS key-pair; relying party enforces the decrypted scope and policy limits.

Publisher can revoke or rotate any delegation instantly by updating the DNS+ records, which propagate via DNS TTL mechanisms.

Example Zone Snippet

```
$ORIGIN example.com.
$TTL 300
paybot IN TXT
“agent.meta={\“name\”:\“PayBot\”,\“version\”:\“2.3.1\”,\“owner\”:\
“Example AI”,\“model\”:\“sonnet-4-classic\”}”
paybot IN TXT
“agent.cap=[\“urn:cap:payments:initiate\”,\“urn:cap:payments:check-
status\”]”
paybot IN TXT
“agent.policy={\“payments\”:{\“dailyLimitCHF\”:500},\“pii\”:{\“store\”;\
“no\”}}”
paybot IN TXT “agent.attest={\“sbom\”:\”file.ref=sbom-
paybot.json#sha256 -...\”}”
paybot IN TXT “agent.jwks={\“url\”:\”paybot.contoso.ai/.well-
known/jwks.json\”}”
paybot IN TXT “agent.grant;aud=bankxyz.ch;sub=alice.example
BASE64(AES-GCM(Kyber-encapsulated))”
paybot IN TXT “agent.scope;aud-bankxyz.ch;sub=alice.example
BASE64(AES-GCM(Kyber-encapsulated))”
```

Example Applications

Example 1

A financial institution (bankxyz.ch) can:

Discover PayBot's capabilities.

Verify its attestation provenance.

Decrypt per-recipient grants authorizing limited SEPA transfers.

Enforce usage constraints without manual key exchange.

Example 2

Domain-to-Domain Agentic Communication:

paybot.example.com wants to pay shopbot.merchant-.com, communication via agent.grant TXT.

Enterprise SaaS platforms can use DNS+ to grant or revoke API access for AI agents, while analytics services can respect agent.dp privacy budgets when aggregating anonymized data.

It should be understood that the core innovation of DNS+ lies in enabling recipient-specific encrypted data fields to be published via DNS infrastructure, without reliance on centralized APIs, blockchain, or Transport Layer Security (TLS) sessions. Each field is encrypted using AES-GCM and made accessible only to designated recipients via Kyber-768 key encapsulation. The DNS records (including enc., key., meta.* prefixes) are structured to support per-field resolution, revocation, and authentication using DNSSEC. In this manner, DNS+ effectively repurposes DNS into a cryptographically verifiable, decentralized metadata distribution channel for private and confidential data.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A method for securely distributing confidential data via the Domain Name System (DNS), comprising:

encrypting data fields using authenticated symmetric encryption with AES-256-GCM to produce encrypted data;

encapsulating a symmetric encryption key using a recipient-specific post-quantum public key cryptography scheme based on Kyber-768;

publishing the encrypted data, encapsulated key, and associated metadata as DNS TXT records within a structured subdomain namespace;

securing said DNS TXT records using Domain Name System Security Extensions (DNSSEC) to guarantee authenticity and integrity; and enabling authorized recipients to retrieve, verify, decapsulate, and decrypt the confidential data by resolving the DNS TXT records.

2. The method of claim 1, wherein the metadata associated with each DNS TXT record includes versioning, expiration information, and revocation status, enabling real-time lifecycle management of encrypted fields.

3. The method of claim 1, wherein the structured DNS TXT records are categorized into record types comprising enc., key., meta., rev., file., zk., and auth.*, each serving a specific function for secure data encapsulation, access control, or linkage to external resources.

4. The method of claim 1, further comprising the use of revocation records (rev.*) which allow the immediate invalidation of previously published encrypted data fields, wherein a revocation flag can be set to disable access.

5. The method of claim 1, wherein external large files, otherwise referenced as content exceeding DNS payload constraints, are referenced via file.* DNS TXT records containing Uniform Resource Identifiers (URIs) and cryptographic checksums for off-DNS retrieval and verification.

6. A system for post-quantum secure data sharing using DNS, comprising:

a publisher module, comprising a memory, configured to encrypt data fields with AES-256-GCM, encapsulate symmetric keys using Kyber-768 with recipient public keys, generate metadata records, and publish said records as DNS TXT records under DNSSEC-signed zones;

a DNS resolver module, comprising a memory, capable of retrieving said DNS TXT records, verifying DNSSEC signatures, performing Kyber-768 decapsulation to recover symmetric keys, and decrypting the encrypted data fields for authorized recipients; and an API and software development kit (SDK) providing interfaces for secure record generation, publishing, validation, and resolution.

7. The system of claim 6, wherein the DNS+ protocol implemented by the publisher module and the DNS resolver module supports differential privacy techniques within metadata records to mitigate statistical and behavioral leakage from DNS queries.

8. The system of claim 7, wherein the DNS TXT records utilize a namespace scheme, encoding at least the following to allow granular per-field access control and resolution:

field names, protocol version numbers, and domain identifiers.

9. The system of claim 7, wherein the publication and resolution processes are compatible and forward-compatible with emerging DNS record types and extensions, including but not limited to SVCB and HTTPS DNS resource records.

10. The system of claim 6, wherein the DNS TXT records utilize a namespace scheme, encoding at least the following to allow granular per-field access control and resolution:

field names, protocol version numbers, and domain identifiers.

11. The system of claim 6, wherein the publication and resolution processes are compatible and forward-compatible with emerging DNS record types and extensions, including but not limited to SVCB and HTTPS DNS resource records.

12. The system of claim 6, wherein the publisher module includes an API and command-line interface supporting automated record generation, validation, and publishing, integrating with dynamic DNS zones and CI/CD workflows.

13. The system of claim 6, wherein the DNS resolver module further implements revocation checks by querying rev.* DNS TXT records to determine whether a previously published encrypted data field has been invalidated before decryption.

14. A method for establishing and managing identity, authorization, and delegation of actions for autonomous or artificial-intelligence (AI) agents using a DNS-based cryptographic protocol, comprising:

publishing, under a domain name associated with an AI agent, one or more public DNS TXT records containing metadata, capabilities, and verification information;

publishing one or more encrypted DNS TXT records containing per-recipient authorization data, each encrypted using a symmetric encryption algorithm and encapsulated by a post-quantum key-encapsulation mechanism;

performing DNSSEC validation of said records to ensure authenticity and integrity;

retrieving and decrypting the per-recipient encrypted records using a corresponding private key of the intended recipient; and enforcing, by a relying party, access policies and authorization scopes derived from decrypted information.

15. The method of claim 14, wherein the symmetric encryption algorithm is AES-256-GCM.

16. The method of claim 14, wherein the post-quantum key-encapsulation mechanism is ML-KEM Kyber-768.

17. The method of claim 14, wherein said public records include one or more of: agent.meta, agent.cap, agent.policy, agent.jwks, and agent.attest.

18. The method of claim 14, wherein said encrypted records include one or more of: agent.grant, agent.scope, agent.route, agent.billing, and agent.dp.

19. The method of claim 14, wherein each encrypted DNS TXT record is individually addressed to a specific relying party or recipient domain.

20. The method of claim 14, further comprising revoking or rotating a delegation by republishing an updated encrypted record, wherein such revocation propagates through standard DNS update and TTL mechanisms.

21. The method of claim 14, wherein attestation data comprises references to software bill-of-materials manifests, trusted-execution-environment proofs, or other integrity attestations.

22. The method of claim 14, wherein the relying party performs signature verification of AI agent-initiated requests using the agent's JWKS record.

23. The method of claim 14, wherein the encrypted authorization data defines scoped permissions, transaction limits, or differential-privacy constraints.

24. The method of claim 14, wherein two or more AI agents, each identified by a distinct domain name, establish reciprocal communication through public and encrypted DNS records, thereby enabling the exchange of attestations, authorization delegations, and routing information via DNSSEC and DNS+ mechanisms.

25. The method of claim 14, wherein both end-users and organizational entities may operate AI agents under domains they control, and such agents mutually authenticate and authorize each other through DNS resolution and per-recipient decryption of encrypted DNS+ records.

* * * * *